(12) United States Patent
Perry

(10) Patent No.: US 11,059,336 B1
(45) Date of Patent: Jul. 13, 2021

(54) RETRACTABLE HITCH ADAPTOR SYSTEM

(71) Applicant: Charles L. Perry, New Port Richey, FL (US)

(72) Inventor: Charles L. Perry, New Port Richey, FL (US)

( * ) Notice: Subject to any disclaimer, the term of this patent is extended or adjusted under 35 U.S.C. 154(b) by 296 days.

(21) Appl. No.: 16/372,893

(22) Filed: Apr. 2, 2019

Related U.S. Application Data

(60) Provisional application No. 62/652,969, filed on Apr. 5, 2018.

(51) Int. Cl.
*B60D 1/54* (2006.01)
*B60D 1/06* (2006.01)

(52) U.S. Cl.
CPC ........ *B60D 1/54* (2013.01); *B60D 1/06* (2013.01)

(58) Field of Classification Search
CPC .................. B60D 1/54; B60D 2001/542
USPC .................... 280/491.1, 491.3, 511
See application file for complete search history.

(56) References Cited

U.S. PATENT DOCUMENTS

| | | | | |
|---|---|---|---|---|
| 4,570,966 A | * | 2/1986 | Giboney | B62D 53/0842 280/415.1 |
| 5,160,157 A | * | 11/1992 | Hubler | B60D 1/06 280/423.1 |
| 5,242,186 A | * | 9/1993 | Pettersson | B60D 1/52 280/491.5 |
| 6,598,897 B1 | * | 7/2003 | Patti | B60D 1/06 280/478.1 |
| 2004/0150189 A1 | * | 8/2004 | Deanda | B60D 1/54 280/491.1 |
| 2019/0322144 A1 | * | 10/2019 | Shaeff | B60D 1/246 |

FOREIGN PATENT DOCUMENTS

| | | | | |
|---|---|---|---|---|
| DE | 19651562 A1 | * | 6/1998 | ............ B60D 1/06 |
| DE | 10004523 A1 | * | 8/2001 | ............ B60D 1/64 |
| DE | 10243044 A1 | * | 5/2004 | ............ B60D 1/246 |
| DE | 102014209727 A1 | * | 12/2014 | ............ B60D 1/54 |
| EP | 1584500 A1 | * | 10/2005 | ............ B60D 1/06 |
| EP | 1586470 A1 | * | 10/2005 | ............ B60D 1/246 |
| EP | 1586471 A1 | * | 10/2005 | ............ B60D 1/246 |
| WO | WO-2018160819 A1 | * | 9/2018 | ............ B60D 1/07 |

* cited by examiner

*Primary Examiner* — Ruth Ilan
*Assistant Examiner* — Myles A Harris

(57) ABSTRACT

A movable assembly is formed of a reciprocable sub-assembly and a pivotable sub-assembly. The reciprocable sub-assembly has a tubular housing. The tubular housing is reciprocable within a receiver. The reciprocable sub-assembly has a block reciprocable within the housing. The pivotable sub-assembly has a trailer hitch ball and a pivot sleeve. A neck fixedly couples the trailer hitch ball and the pivot sleeve.

4 Claims, 3 Drawing Sheets

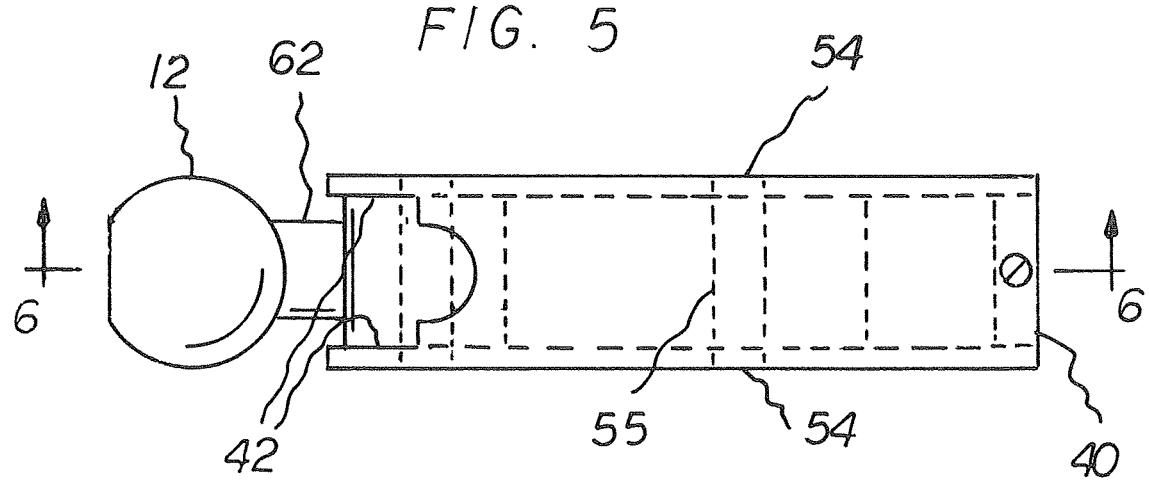
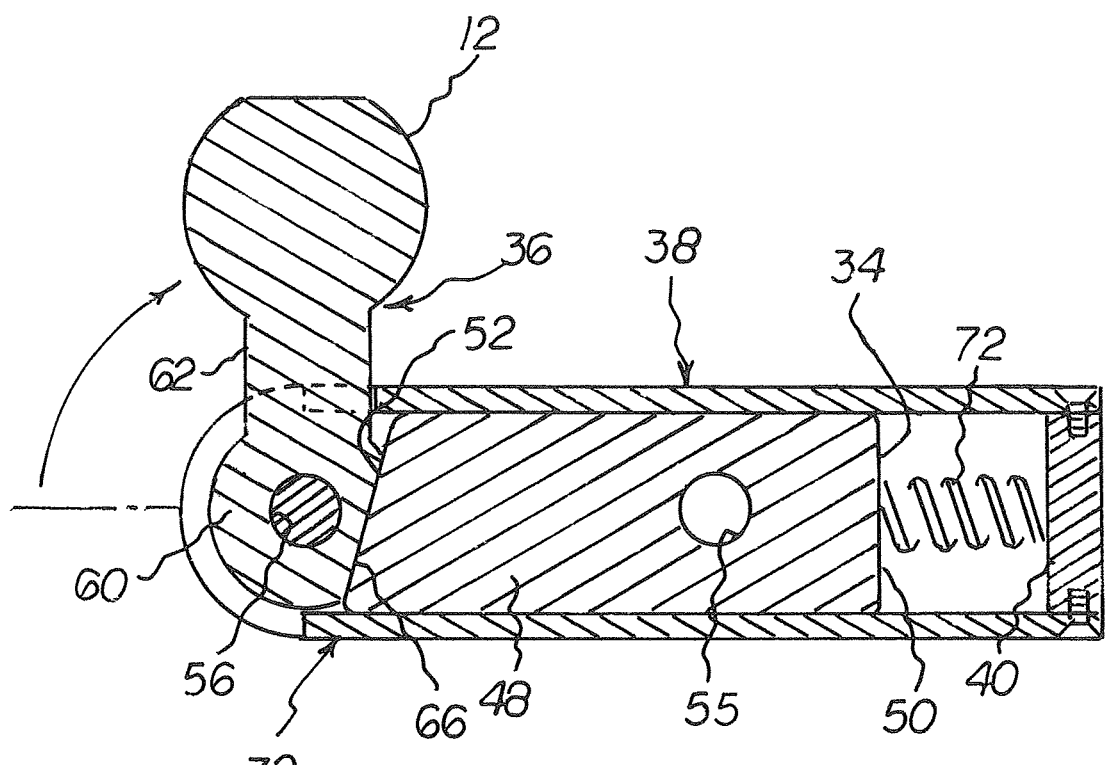

RETRACTABLE HITCH ADAPTOR SYSTEM

RELATED APPLICATION

This non-provisional application is based upon Provisional Application No. 62/652,969 filed Apr. 5, 2018, the priority of which is claimed and the subject matter of which is incorporated herein by reference.

BACKGROUND OF THE INVENTION

Field of the Invention

The present invention relates to a retractable hitch adaptor system and more particularly pertains to retracting a trailer hitch ball from a lowered orientation for storage when not in use and for extending the trailer hitch ball to a raised orientation for use.

Description of the Prior Art

The use of trailer hitch systems of known designs and configurations is known in the prior art. More specifically, trailer hitch systems of known designs and configurations previously devised and utilized for the purpose of storing and using trailer hitch balls are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a retractable hitch adaptor system that allows retracting a trailer hitch ball from a lowered orientation for storage when not in use and for extending the trailer hitch ball to a raised orientation for use.

In this respect, the retractable hitch adaptor system according to the present invention substantially departs from the conventional concepts and designs of the prior art, and in doing so provides an apparatus primarily developed for the purpose of retracting a trailer hitch ball from a lowered orientation for storage when not in use and for extending the trailer hitch ball to a raised orientation for use.

Therefore, it can be appreciated that there exists a continuing need for a new and improved retractable hitch adaptor system which can be used for retracting a trailer hitch ball from a lowered orientation for storage when not in use and for extending the trailer hitch ball to a raised orientation for use. The retracting and the extending are done in a safe, convenient, and economical manner. In this regard, the present invention substantially fulfills this need.

SUMMARY OF THE INVENTION

In view of the disadvantages inherent in the known types of trailer hitch systems of known designs and configurations now present in the prior art, the present invention provides an improved retractable hitch adaptor system. As such, the general purpose of the present invention, which will be described subsequently in greater detail, is to provide a new and improved retractable hitch adaptor system and method which has all the advantages of the prior art and none of the disadvantages.

To attain this, the present invention essentially comprises a movable assembly 32 formed of a reciprocable sub-assembly 34 and a pivotable sub-assembly 36. The reciprocable sub-assembly 34 has a tubular housing 38. The tubular housing is reciprocable within a receiver 22. The reciprocable sub-assembly 34 has a block 48 reciprocable within the housing. The pivotable sub-assembly 36 has a trailer hitch ball 12 and a pivot sleeve 60. A neck 62 fixedly couples the trailer hitch ball and the pivot sleeve.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved retractable hitch adaptor system which has all of the advantages of the prior art trailer hitch systems of known designs and configurations and none of the disadvantages.

It is another object of the present invention to provide a new and improved retractable hitch adaptor system which may be easily and efficiently manufactured and marketed.

It is further object of the present invention to provide a new and improved retractable hitch adaptor system which is of durable and reliable constructions.

An even further object of the present invention is to provide a new and improved retractable hitch adaptor system which is susceptible of a low cost of manufacture with regard to both materials and labor, and which accordingly is then susceptible of low prices of sale to the consuming public, thereby making such retractable hitch adaptor system economically available to the buying public.

Lastly, it is another object of the present invention is to provide a retractable hitch adaptor system which can be used for retracting a trailer hitch ball from a lowered orientation for storage when not in use and for extending the trailer hitch ball to a raised orientation for use.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a plan view taken along line 5-5 of FIG. 4.

FIG. 6 is a cross sectional view taken along line 6-6 of FIG. 5.

The same reference numerals refer to the same parts throughout the various Figures.

DESCRIPTION OF THE PREFERRED EMBODIMENT

Figure 1:
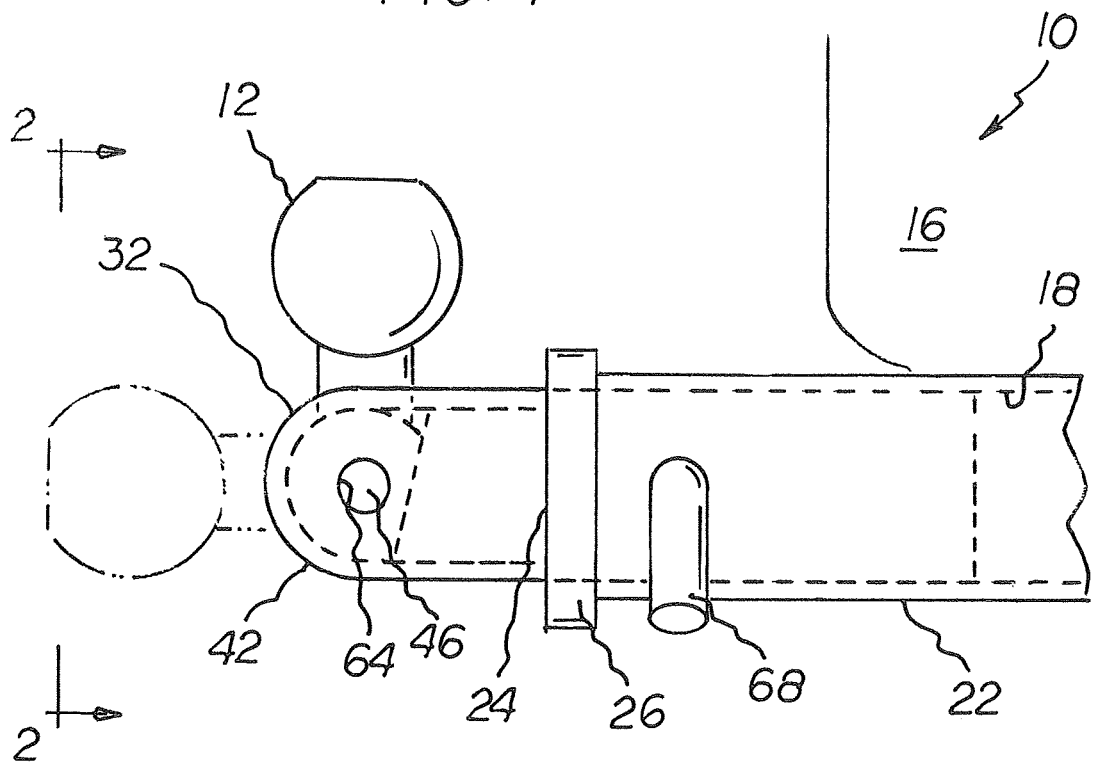
FIG. 1 is a side elevational view of a retractable hitch adaptor system constructed in accordance with the principles of the present invention.
Figure 2:
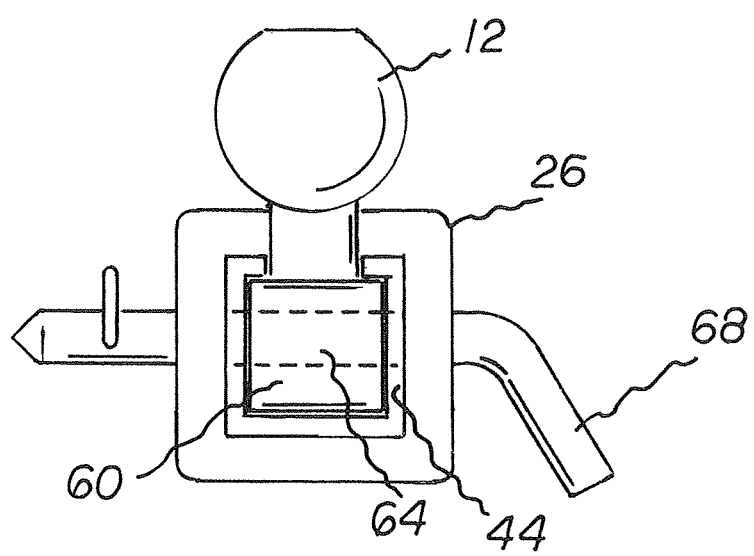
FIG. 2 is a front elevational view of the system taken along line 2-2 of FIG. 1.
Figure 3:
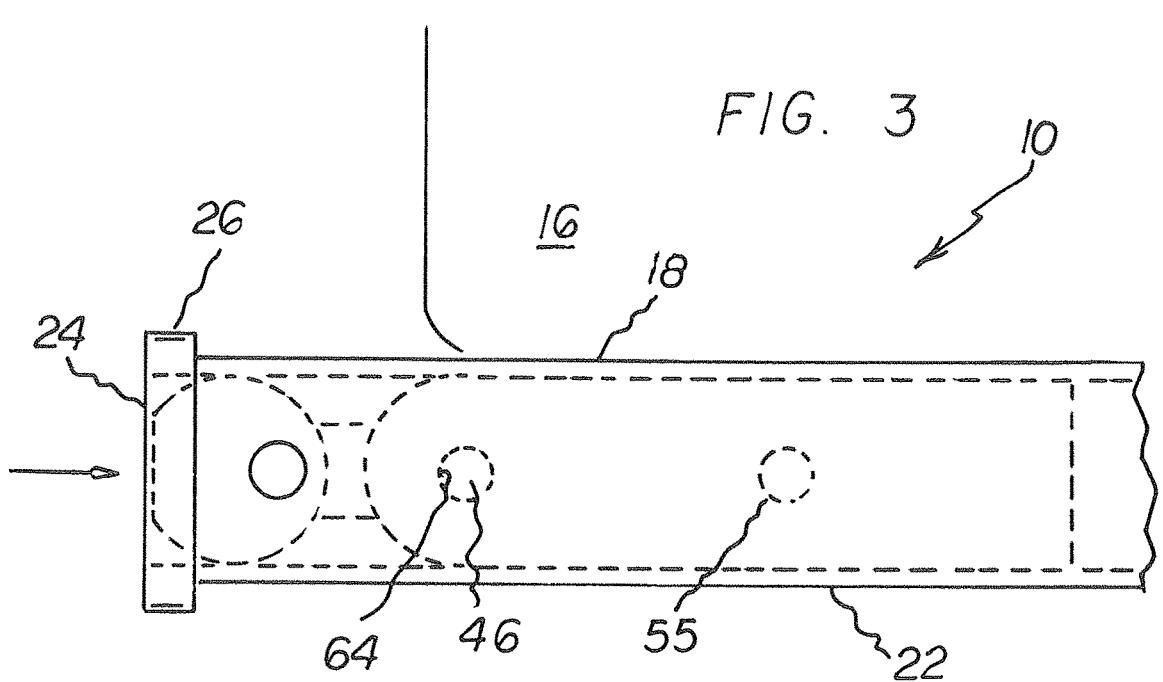
FIG. 3 is a side elevational view similar to FIG. 1 but with the ball in a lowered orientation for storage.
Figure 4:
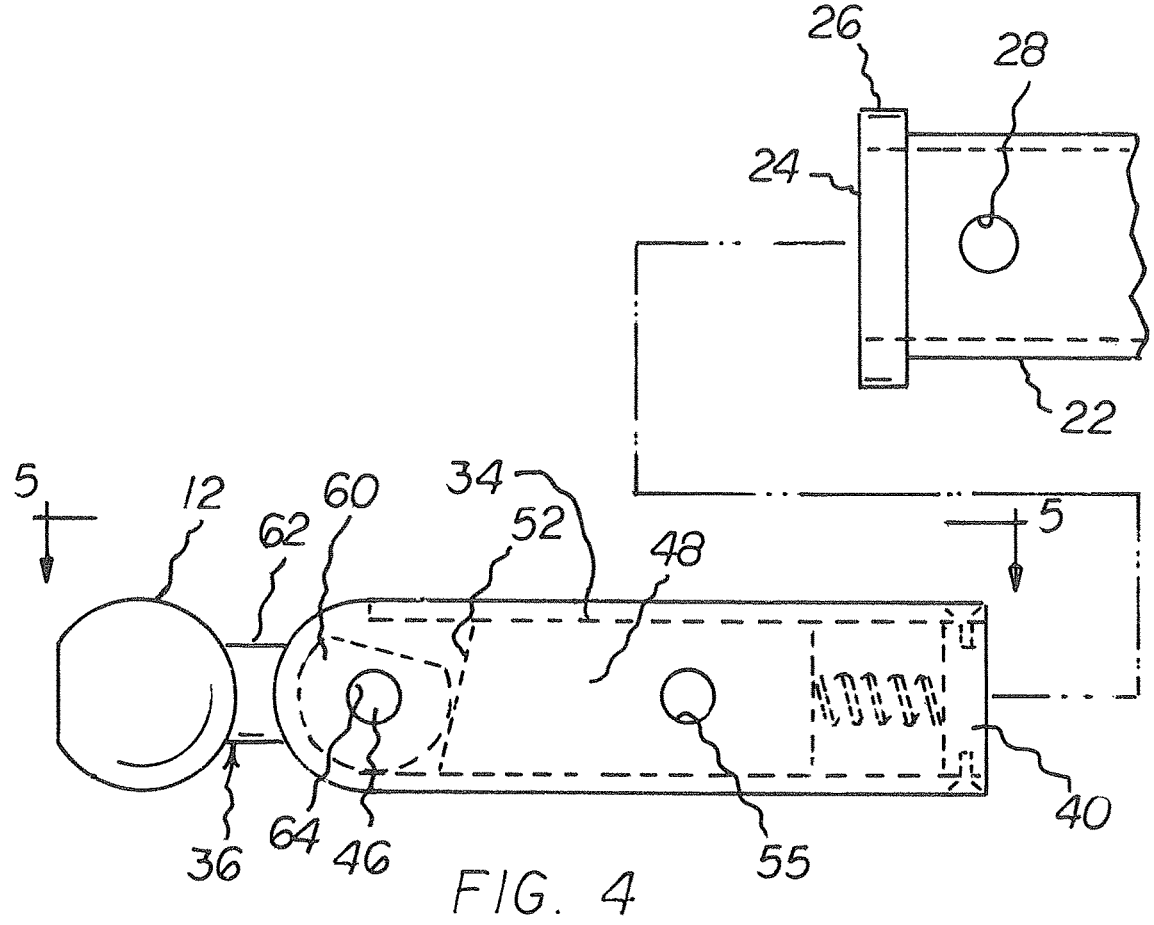
FIG. 4 is an exploded side elevational view similar to FIG. 3 but with the movable assembly exterior of the tubular receiver.

With reference now to the drawings, and in particular to FIG. 1 thereof, the preferred embodiment of the new and improved retractable hitch adaptor system embodying the principles and concepts of the present invention and generally designated by the reference numeral 10 will be described.

The present invention, the retractable hitch adaptor system 10 is comprised of a plurality of components. Such components in their broadest context include a movable assembly formed of a reciprocable sub-assembly and a pivotable sub-assembly. Such components are individually configured and correlated with respect to each other so as to attain the desired objective.

In the preferred embodiment of the retractable hitch adaptor system, designated by reference numeral 10, first provided is a vehicle 16 having a rear end with a reception area 18. The reception area is located at a lower, central region of the vehicle.

A tubular receiver 22 is next provided. The tubular receiver has a square cross sectional configuration terminating in a rearward opening 24. The tubular receiver terminates rearwardly with a strengthening collar 26 located rearwardly of the rear end of the vehicle. Axially aligned exterior holes 28 extend horizontally through the receiver forwardly of the collar.

Next provided is a movable assembly 32. The movable assembly is formed of a reciprocable sub-assembly 34 and a pivotable sub-assembly 36.

The reciprocable sub-assembly 34 has a tubular housing 38 with a square cross sectional configuration. The tubular housing is reciprocable within a receiver. The tubular housing has a forward end terminating in a base plate 40. The tubular housing has a rearward end terminating in a vertical slot 44 creating opposed support surfaces 42. Axially aligned intermediate holes 46 extend horizontally through the tubular housing 38. The reciprocable sub-assembly 34 has a block 48 with a square cross sectional configuration. The block is reciprocable within the housing. The block has a forward end terminating in a vertical face 50. The block has a rearward end terminating in an angled face 52. An interior hole 55 extending through the block is adapted to axially align with the exterior holes 28 and intermediate holes 54. Axially aligned forward holes 56 extend through the support surfaces.

The pivotable sub-assembly 36 has a trailer hitch ball 12, a pivot sleeve 60, and a neck 62. The neck fixedly couples the trailer hitch ball and the pivot sleeve. A flat surface 66 on the pivot sleeve is adapted to contact the rearward surface 52 of the block 48 to hold the trailer hitch ball in the raised orientation for use. A pivot pin 64 extends through the pivot sleeve and the holes 46 to facilitate pivoting the neck and the hitch to a raised orientation for use and a lowered orientation for storage within the housing.

In the preferred embodiment as illustrated in the Figures, the rearward surface 52 of the block 48 is at 15 degrees from the vertical. During operation and use, the flat surface 66 of the pivot sleeve 60 is in facing contact with the flat surface of the block at the same 15 degrees. Both the flat surface and the rearward surface are planar. It should be understood, however, that the 15 degree angle may be more or less as a function of the application and usage. Similarly, the rearward surface and the flat surface may be other than planar, as for example, arcuate or even saw-toothed with projections and recesses, again as a function of the application and usage.

A locking pin 68 is provided. The locking pin extends through the exterior holes 28 and the intermediate holes 54 and the interior hole 55 to hold the system in an operative orientation.

Lastly, a coil spring 72 is provided between the base plate 40 and the block 48 to urge the block rearwardly to facilitate converting the system from the inoperative orientation to the operative orientation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A retractable trailer hitch adaptor system comprising:
   a movable assembly (32) formed of a reciprocable sub-assembly (34) and the pivotable sub-assembly (36), the reciprocable sub-assembly (34) having a tubular housing (38), the tubular housing being reciprocable within a receiver (22), the reciprocable sub-assembly (34) including a block (48) reciprocable within the tubular housing; and
   the pivotable sub-assembly (36) having a trailer hitch ball (12), and a pivot sleeve (60), and a neck (62) fixedly coupling the trailer hitch ball and the pivot sleeve, the pivot sleeve being pivotably coupled to the tubular housing.

2. The system as set forth in claim 1 wherein the block has a planar rearward surface (52) at 15 degrees from the vertical and the pivot sleeve (60) has a planar surface in facing contact with the rearward surface of the block during operation and use.

3. The system as set forth in claim 1 wherein the pivot sleeve is rotatable about a horizontal transverse axis of rotation.

4. A retractable trailer hitch adaptor system (10) removably coupled to a tubular receiver of a vehicle and repositionable between an operative orientation and an inoperative orientation, the system comprising, in combination:

- a vehicle (16) having a rear end with a reception area (18), the reception area being located at a lower central region of the vehicle;
- a tubular receiver (22) having a square cross sectional configuration terminating in a rearward opening (24), the tubular receiver terminating rearwardly with a strengthening collar (26) located rearwardly of the rear end of the vehicle, axially aligned exterior holes (28) extending horizontally through the receiver forwardly of the collar;
- a movable assembly (32) formed of a reciprocable sub-assembly (34) and a pivotable sub-assembly (36), the reciprocable sub-assembly (34) having a tubular housing (38) with a square cross sectional configuration, the tubular housing being reciprocable within the tubular receiver, the tubular housing having a forward end terminating in a base plate (40), the tubular housing having a rearward end terminating in a vertical slot (44) creating opposed support surfaces (42), axially aligned intermediate holes (46) extend horizontally through the tubular housing (38), the reciprocable sub-assembly (34) having a block (48) with a square cross sectional configuration, the block being reciprocable within the housing, the block having a forward end terminating in a vertical face (50), the block having a rearward end terminating in an angled face (52), an interior hole (55) extending through the block adapted to axially align with the exterior holes (28) and intermediate holes (54), axially aligned forward holes (56) extend through the support surfaces;
- the pivotable sub-assembly (36) having a trailer hitch ball (12), a pivot sleeve (60), and a neck (62) fixedly coupling the trailer hitch ball and the pivot sleeve, a flat surface (66) on the pivot sleeve adapted to contact the rearward surface (52) of the block (48) to hold the trailer hitch ball in the raised orientation for use, a pivot pin (64) extending through the pivot sleeve and the holes (46) to facilitate pivoting the neck and the hitch about a horizontal transverse axis of rotation to a raised orientation for use and a lowered orientation for storage within the housing;
- a locking pin (68) extending through the exterior holes (28) and the intermediate holes (54) and the interior hole (55) to hold the system in an operative orientation; and
- a coil spring (72) positioned between the base plate (40) and the block (48) to urge the block rearwardly to facilitate converting the system from the inoperative orientation to the operative orientation.

* * * * *